United States Patent [19]
Simons

[11] 3,924,063
[45] Dec. 2, 1975

[54] VARIABLE OPTICAL WEDGE FOR SCANNING A LIGHT BEAM IN AN APPARATUS FOR READING AN OPTICALLY ENCODED DISC

[75] Inventor: Carel Arthur Jan Simons, Eindhoven, Netherlands

[73] Assignee: U.S. Philips Corporation, New York, N.Y.

[22] Filed: Apr. 29, 1974

[21] Appl. No.: 464,732

[30] Foreign Application Priority Data
Feb. 13, 1974 Netherlands ........................ 7401937

[52] U.S. Cl. .... 178/6.6 R; 178/6.7 A; 179/100.3 E; 179/100.3 V
[51] Int. Cl.² ........................ H04N 5/76; G11B 7/12
[58] Field of Search .............. 178/6.6 R, 6.7 A, 7.6, 178/DIG. 28; 179/100.3 V, 100.41 L, 100.4 R, 100.3 E; 250/201, 202, 203, 548; 350/185, 22, 230, 232, 160 R

[56] References Cited
UNITED STATES PATENTS

| | | | |
|---|---|---|---|
| 3,302,543 | 2/1967 | Ross | 350/22 |
| 3,381,086 | 4/1968 | De Moss et al. | 179/100.3 V |
| 3,530,258 | 9/1970 | Gregg et al. | 179/100.3 U |
| 3,829,622 | 8/1974 | Elliot | 179/100.3 V |

*Primary Examiner*—Raymond F. Cardillo, Jr.
*Attorney, Agent, or Firm*—Frank R. Trifari; Simon L. Cohen

[57] ABSTRACT

An apparatus is described for optically reading a record carrier. Deflection of the read beam over the record carrier can be achieved with the aid of an assembly of a plano-concave and a plano-convex lens, the radiuses of curvature of the curved surfaces of the lenses being equal, and the distances between the curved surfaces being very small. The beam-deflection element is compact, may be disposed near the read objective, and need not meet stringent requirements as regards surface quality.

3 Claims, 8 Drawing Figures

Figure 1:
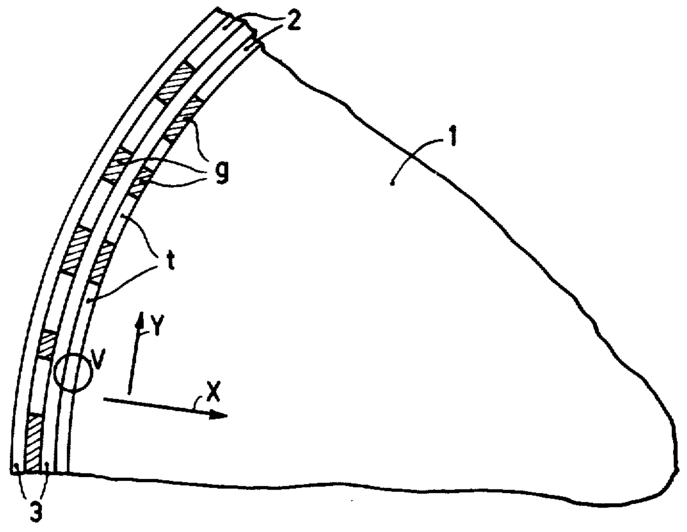

VARIABLE OPTICAL WEDGE FOR SCANNING A LIGHT BEAM IN AN APPARATUS FOR READING AN OPTICALLY ENCODED DISC

The invention relates to an apparatus for reading a record carrier on which information is stored in an optically readable structure of areas and intermediate regions which are arranged along tracks, which apparatus comprises a radiation source which supplies a read beam, an objective system for focussing the read beam to a read spot on the optical structure of the record carrier, a beam deflecting element for moving the read spot in at least one of the directions: transverse to the track direction and coincident with the track direction, and a radiation-sensitive detection system for converting the read beam which is modulated by the regions and intermediate areas into an electrical signal.

It has already been proposed, for example in: "Philips' Technical Review" 33; No. 7, pages 178 – 193, to store a color television program in a round disc-shaped record carrier. The information is contained in the lengths of the areas and intermediate regions.

A track of the record carrier can be read by projecting a read spot of a size of the order of magnitude of the smallest optical detail in the information structure onto the track and moving the read spot and the record carrier relative to each other in the longitudinal direction of the track. The read beam is then modulated in accordance with the sequence of the regions and intermediate areas in the track. For reading the entire record carrier, the read spot and the record carrier must be moved relative to each other in a direction transverse to the direction of the track. For this use is made of a coarse control and a fine control. Coarse control is achieved in that a housing which accommodates the optical elements used for reading, is bodily moved relative to the record carrier. For fine control for example a mirror may be disposed rotatably in the radiation path in front of the objective system. By rotating the mirror the read spot can be moved radially over the information structure.

When reading the record carrier it may furthermore be necessary to correct the position of the read spot in the tangential direction, i.e. in the longitudinal direction of the track, in order to be able to compensate for time-base errors in the detected signal. As proposed in U.S. Pat. No. 3,876,827 a second mirror may be included in the radiation path in front of the objective system, which mirror is rotatable about an axis which is perpendicular to the axis of rotation of the first mirror.

The read beam impinges on the mirrors at angles of approximately 45°. In order to prevent the read beam from becoming excessively astigmatic upon reflection from the mirrors, stringent requirements must be imposed on the planeness of the mirrors.

Furthermore, the mirrors may not be disposed in the pupil of the objective lens, which would be desirable for a stable control of the read beam focussing.

The object of the present invention is to provide a read apparatus which mitigates these drawbacks. The apparatus according to the invention is characterized in that the beam deflecting element consists of an assembly of a plano-concave lens and a plano-convex lens, that the concave surface of the first lens faces the convex surface of the second lens, which surfaces have substantially the same radius of curvature and are disposed at a distance which is substantially smaller than the radius of curvature, at least one of the lenses being rotatable in such a way that the axes of rotation of the lenses are perpendicular to each other and are disposed in a plane perpendicular to the optical axis of the objective system, so that the projections of these axes onto the record carrier extend in the direction of the track and transverse to the track direction.

The beam deflecting element according to the invention is compact and can be disposed substantially within the pupil of the objective system. The lens surfaces may for example, at the same angle of incidence of the read beam, be a factor four less accurate than the surfaces of the said mirrors.

Figure 3A:
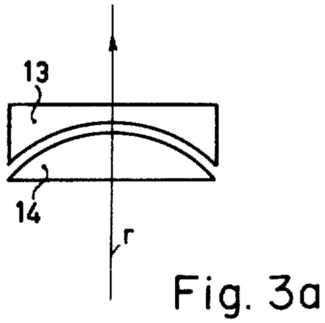
Figure 3B:
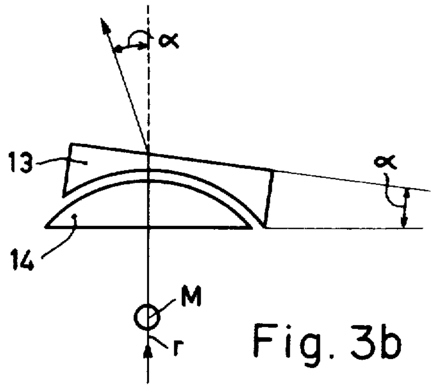
Figure 3C:
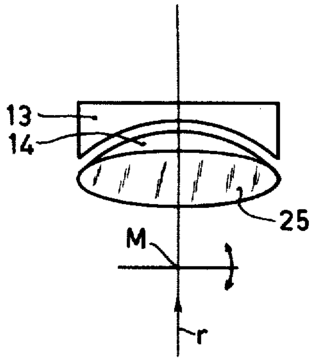
Figure 2:
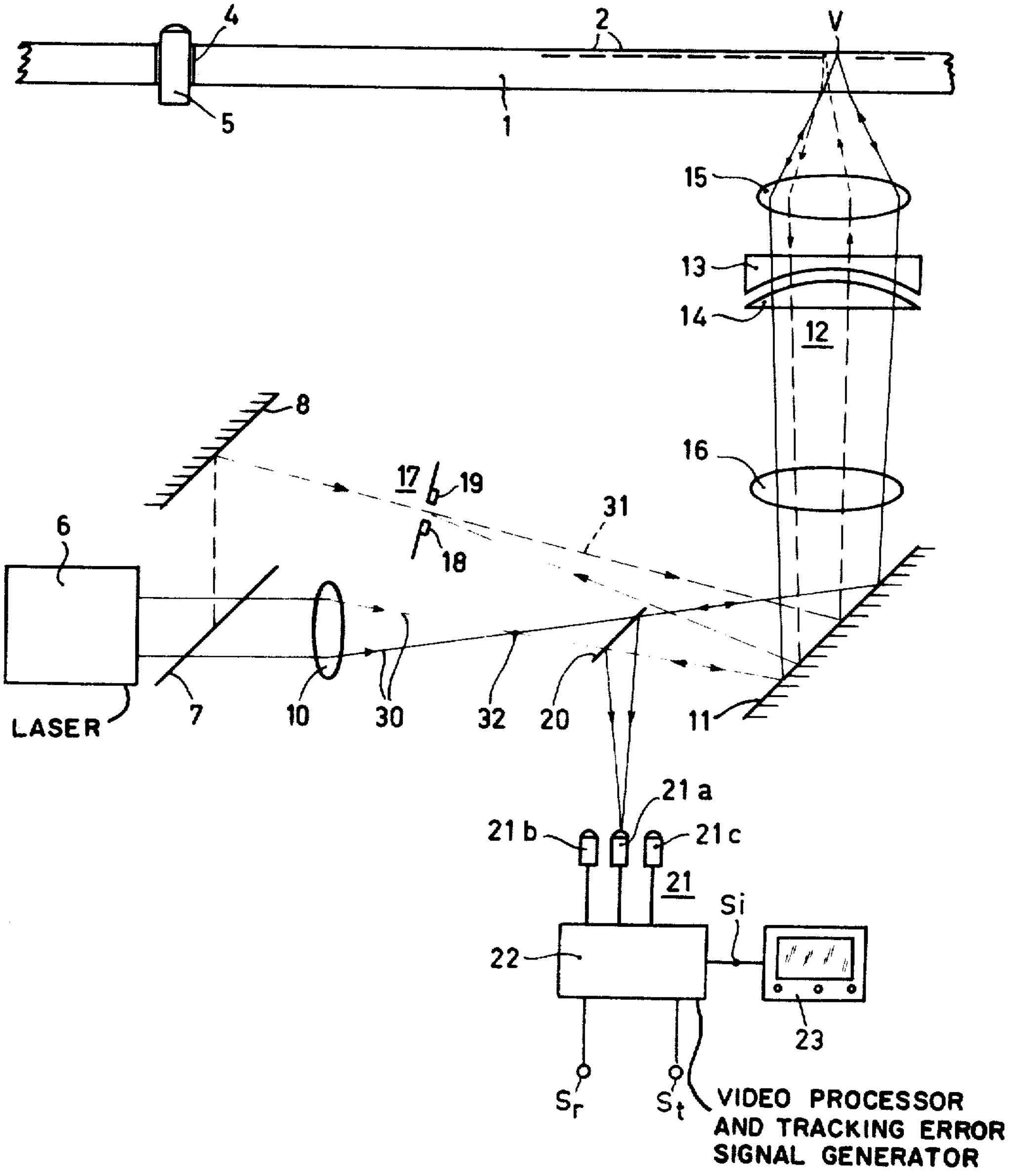
Figure 4:
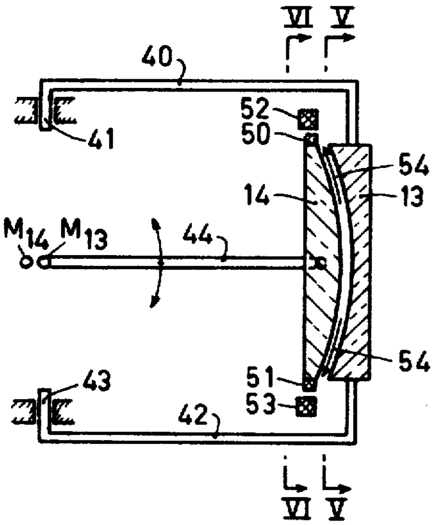
Figure 6:
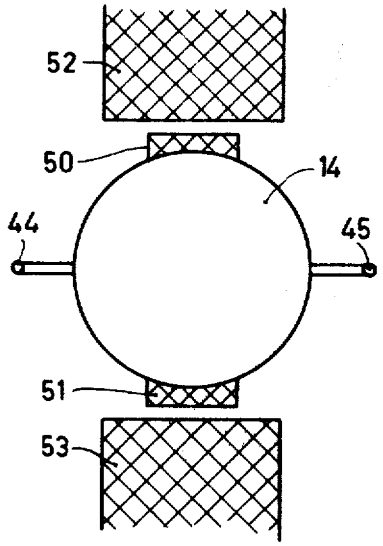
Figure 5:
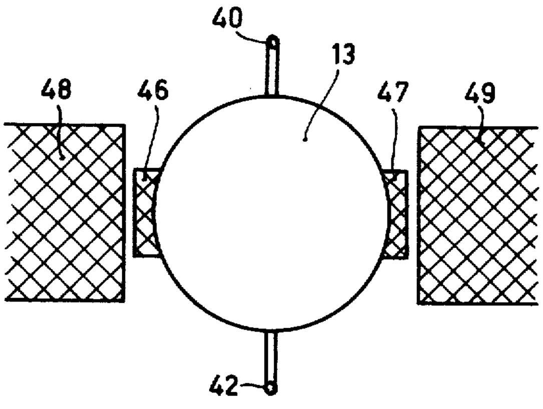

The invention will now be described in more detail with reference to the drawing, in which:

FIG. 1 shows a known record carrier provided with an optically readable structure, FIG. 2 shows an apparatus according to the invention for reading such a structure, FIG. 3, including 3A through 3C, illustrate the operation of a beam deflecting element according to the invention, FIG. 4 shows an embodiment of the mechanical construction of such an element, and FIGS. 5 and 6 show how the lenses of the beam deflecting element can be moved.

FIG. 1 shows a part of a disc-shaped round record carrier 1. The record carrier is provided with a multitude of concentric tracks 2, of which only a few are shown. The tracks 2 comprise a multiplicity of regions g alternating with intermediate areas t. The lengths of the areas and of the intermediate regions are determined by the information stored. Between the information tracks 2 structureless lands 3 are disposed. The tracks can be read with a beam of radiation, which is focussed to a read spot V on the information structure. The areas may be distinct from the intermediate regions and the lands as regards transmission coefficient or as regards reflection coefficient, in which cases the read beam is amplitude modulated. The read beam may also be phase modulated. For this, the areas g must be disposed at a different level in the record carrier than the intermediate regions *t* and the lands 3. Such a phase structure may consist of a multiplicity of pits which are pressed along the tracks in a reflecting record carrier.

An apparatus for reading such a record carrier is shown in FIG. 2. In FIG. 2 the reference numeral 6 denotes a radiation source, for example a laser source. The beam 30 supplied by the radiation source traverses a first lens 10, is subsequently reflected by a plane mirror 11 and is then focussed to a read spot V on the information structure by an objective lens 15. As an example, the information structure is disposed at the upper surface of the record carrier. The lens 10 ensures that the entire pupil of the objective lens 15 is filled. A round disc-shaped record carrier 1 can be rotated by a shaft 5 which extends through a central opening 4 in the record carrier, so that the radiation spot is consecutively projected onto all areas and intermediate areas of a track.

After reflection at the information structure the read beam 30 traverses the objective lens 15 for a second time and is subsequently reflected by the plane mirror 11. Next, the read beam is reflected towards a radiation-sensitive detection system 21, for example, by a semi-transparent mirror 20. The electrical signal supplied by said detection system, which signal is modulated in accordance with the sequence of areas and intermediate regions in a track, is fed to an electronic circuit 22. In the circuit the signal is processed, in known manner, into for example a video and/or audio signal $S_i$, which may be reproduced for example by means of a conventional television receiver 23.

In order to be able to read all tracks of the record carrier after each other, a control system, not shown, is provided by means of which the optical read unit is bodily moved in a radial direction. The coarse control is not rendered operative until the read spot is to be moved over a distance greater than a certain minimum distance. For smaller displacements use is made of a fine control. This fine control is also used for correcting centering errors of the read spot relative to the center of the track to be read. Owing to for example out-of-roundness of the disc-shaped record carrier or an eccentricity of the center of rotation of the disc-shaped record carrier it may happen that the path of an information track is no longer concentric or spiral-shaped relative to the pivot. This may give rise to both a deviation in the radial direction (the $x$-direction in FIG. 1) and in the tangential direction (the $y$-direction in FIG. 1) of the position of the read spot relative to the track to be read. A deviation in the tangential direction results in a time base error of the detected signal, while owing to a deviation in the radial direction the modulation depth of the detector signal may decrease and crosstalk may occur between adjacent tracks.

A centering error of the read spot may for example, as previously proposed in U.S. Pat. No. 3,876,842, be detected with the aid of two additional radiation spots which are projected onto the information structure. The two additional radiation spots are projected on the edge of the track to be read and, viewed in the longitudinal direction of the track, are offset in opposite directions relative to the read spot. The two additional radiation spots may, for example, be obtained by including a grating, not shown, in the radiation path in front of the lens 10. The grating diffracts the beams produced by the radiation source into a zero-order beam and two first-order beams. The beams are focussed by the objective lens 15 to radiation spots on the information structure at different locations. In the detection system 21 a separate detector is provided for each radiation spot. The detector element 21$a$ supplies a high-frequency information signal. By comparing the electrical signals supplied by the detector elements 21$b$ and 21$c$ an indication can be obtained of the magnitude and direction of a possible centering error of the read spot. The electronic circuit 22 can derive a control signal Sr for centering correction from the two last-mentioned signals.

As is described in the U.S. Pat. No. 3,876,842, it is also possible to derive from the signals supplied by the detectors 21b and 21c an indication of a deviation in the tangential direction, with the aid of a phase-shifting element which causes a phase shift equal to one fourth of the revolution period of the record carrier. The electronic circuit 22 then also derives a signal $S_t$ for correcting the tangential position of the read spot.

In the previously proposed read apparatus the mirror 11 was rotatably supported for correcting the radial position of the read spot. The angular position of said mirror was determined by the signal Sr. For correcting the tangential position of the read spot a second rotatable mirror, not shown, was provided, whose angular position was determined by the signal $S_t$. The read beam was incident on the mirrors at an angle of approximately 45°. The mirrors were disposed in a diverging beam. If the mirrors were not equally plane over their entire surface, besides the occurrence of a displacement of the eventual radiation spot on the information structure, the read beam would become astigmatic, so that even after reduced imaging onto the record carrier, the read spot would not be suited for a correct reading. As a result of the defocussing, the modulation depth of the detected signal decreases, while moreover cross-talk between adjacent tracks may occur. The focussing error δ is given by $$\delta = \frac{1}{v^2}\Delta$$

where $v$ is the magnification factor of the objective lens, while Δ is the displacement of the focal point 32 of the lens 10. The geometric diameter of the circle of unsharpness on the information structure is proportional to $\delta . x$N.A, in which N.A. is the numerical aperture of the objective lens 15. Even for a slight deviation in the planeness of the mirror the unsharpness is no longer permissible.

In view of the fact that the mirror must be rotatable makes an angle of 45° with the optical axis of the read system when in the rest position, the mirror which is nearest to the objective lens may not be placed in the pupil of the lens. Of course, the other mirror is even further away from the pupil. For a stable focussing control of the read beam this is undesirable, as will appear from the following.

For detecting focussing errors use can be made of an auxiliary beam 31 of smaller diameter, as is shown in FIG. 2. The beam, of which for clarity only one ray is shown, is split from the main beam by means of a semi-transparent mirror 7 and a fully reflecting mirror 8. The beam 31 falls onto the mirror 11 through a slit of a diaphragm 17 and after reflection traverses the objective lens 15 in a point outside the optical axis of the lens. The auxiliary beam is subsequently incident on the information structure at an acute angle. After reflection at the information structure the beam 31 passes the objective lens again outside the optical axis, and is then reflected towards the diaphragm slit by the plane mirror. When the distance from the plane of the information structure to the objective lens is correct, the image of the diaphragm slit is symmetrical relative to the actual diaphragm slit. As a result, two radiation-sensitive detectors disposed at either side of said slit receive the same amount of radiation.

If the plane of the information structure is moved relative to the objective lens, the reflected sub-beam 31 traverses another part of the lens. As a result, the beam is refracted through a different angle than in case that the plane of the information structure is in the desired position. The image of the diaphragm slit then moves over the detectors 18 and 19. By comparing the output signals of the detectors an indication can be obtained about the magnitude and the direction of a read-beam defocussing.

The auxiliary beam 31 also traverses the elements for deflecting the read beam. If the elements are disposed at some distance from the pupil of the objective lens 15, as will be the case for the mirrors, the auxiliary beam will be if deflected over the pupils of the objective lens 15 when the elements are rotated. The direction of the auxiliary beam is then no longer determined exclusively by the position of the plane of the information structure, so that no accurate focussing detection is possible any longer.

According to the invention an assembly 12 of two lenses 13 and 14 is used for deflecting the read beam. The lens 14 is a plano-convex lens and the lens 13 is a plano-concave lens. The curvature of the concave surface of the lens 13 is substantially equal to that of the convex surface of the lens 14. In principle, the lenses may be placed against each other. However, in practice, there will be an air gap between the lenses, which air gap is very small, for example 50–100 $\mu$m. Each lens of the assembly is rotatable about an axis through the center of curvature of the curved lens surface.

FIG. 3 illustrates the operation of the lens assembly 12. A radiation beam $r$, schematically represented by one ray only, traverses the lens system without refraction if the plane surfaces of the lenses 13 and 14 are in parallel. When the lens 13 is rotated through an angle $\alpha$ about an axis which passes through the center of curvature M and which is perpendicular to the plane of drawing, the beam upon emergence from the lens system is refracted in a direction which is located in the plane of the drawing (case $b$). By such a rotation of the lens 13 the beam will be deflected in a radial direction in the apparatus of FIG. 2. The magnitude of the deflection is determined by the wedge angle $\alpha$ between the plane surfaces of the lenses 13 and 14.

If, as is shown in FIG. 3 under c), the plano-convex lens 14 is rotated through an angle $\beta$, not shown, about an axis through the centre of curvature M and disposed in the plane of drawing, the radiation beam r upon entering the lens system will be refracted in a direction which is disposed in a plane perpendicular to the plane of drawing. Owing to such a rotation of the lens 14 the read beam in the apparatus of FIG. 2 will be deflected tangentially, i.e. in the direction of the tracks 2. In FIG. 3 the plane surface of the lens 14, which becomes partly visible upon rotation of said lens, is denoted by 25.

In an embodiment of a lens system according to the invention the minimum thickness of the plano-concave lens 13 was 1 mm, while the maximum thickness of the plano-convex lens 14 was 2 mm. The diameter of the lenses was 8 mm. The lenses could be rotated through an angle of ± 5°. In the apparatus of FIG. 2 the lens 13 could be disposed at a distance of 3 mm from the objective lens.

When passing from a first medium with a refractive index $n_1$ to a second medium with a refractive index $n_2$, the deviation in the wave front of a beam of radiation owing to irregularities at the interface is proportional to $(n_1-n_2)$. When a radiation beam which propagates through air is reflected, $n_1$ may be assumed to be $-1$ (−sign owing to the reflection) and $n_2$ to be $+1$. The deviation is then proportional to 2. In the case of refraction of the radiation beam by a lens, $n_1$ is approximately 1.5 and $n_2$ is again $+1$, so that the deviation is then proportional to 0.5. The requirements to be imposed on the surface of a mirror must therefore be a factor 4 more stringent than the requirements to be imposed on the surfaces of the lenses for the same angle of incidence of the read beam. Because the angle of incidence of the read beam on the lens surface of the lens 14 is near 90° the requirements imposed on the lens surfaces are even less stringent.

For greater wedge angles $\alpha$ and $\beta$ between the plane surfaces of the lenses 13 and 14 asymmetry errors may occur, mainly coma. This may give rise to a non-uniform intensity distribution over a radiation spot formed on the record carrier for different positions of the lenses 13 and 14. The occurrence of asymmetry errors can be prevented in a simple manner by including a single positive lens 16 in the radiation path as a correction element. The lens 16 may be disposed both in front of and behind the lens system 12. Preferably, it is disposed between the mirror 11 and the lens system 12, so that said system 12 may be placed close to the objective 15. By using materials with a high refractive index ($n = 1.7$ for example) for the lenses 13 and 14, a certain deflection of the radiation beam can be obtained at smaller wedge angles $\alpha$ and $\beta$, than if the lenses are made of materials with a low refractive index.

The fact that the invention has been described with reference to the apparatus of FIG. 2, by no means implies that the scope of the invention is limited to said specific apparatus. The signals Sr and St can be obtained in various manners, but the manner in which falls beyond the scope of the present invention. Also when reading other than disc-shaped record carriers, such as record carriers in the form of a tape or cylindrical record carriers, errors may occur in the centering or in the tangential guidance of the read spot relative to the track to be read, so that also in these cases a deflection element 12 according to the invention may be employed. Of course, the information stored on the record carrier may be other than a television program.

FIG. 4 illustrates a possible method of suspending a lens system according to the invention. By means of two rods 40 and 42 the lens 13 is moved in a direction perpendicular to the plane of drawing. The rods are rotatable in the bearings 41 and 43. The lens 14 is movable in the direction indicated by arrows 54 in the plane of drawing. Furthermore, two rods 44 and 45 are attached to the lens, which rods are disposed before and behind the plane of drawing. Only the rod 44 which is disposed behind the plane of drawing is shown. The connection line of the bearings 41 and 43 and the connection line of the bearings in which the rods 44 and 45 are mounted pass through the centers of curvature $M_{13}$ and $M_{14}$ respectively, which substantially coincide.

The lenses 13 and 14 can be moved with the aid of magnetic fields as is shown in FIGS. 5 and 6. FIG. 5 is a section taken on the line 5, 5' of FIG. 4, while FIG. 6 is a section on the line 6, 6' of FIG. 4. On the lens 13 filamentary windings 46 and 47 are disposed. Said filamentary windings are located in a permanent-magnet field which is produced by two magnet poles 48 and 49. The control signal Sr for the radial position of the read spot, derived in the apparatus of FIG. 2, may be applied to the filamentary windings 46 and 47. By means of the signal St the lens 13 in FIG. 5 can be moved to the left or to the right.

The control signal St of the tangential guidance of the read spot may be applied to the windings 50 and 51, which are disposed on the lens 14, and which are located in a magnetic field produced by the magnet poles 52 and 53. By means of the signal St the lens 14, in FIG. 6, can be moved upwards or downwards.

By means of the rods 40 and 41, and 44 and 45 respectively the movement to the left or to the right in FIG. 5 or the up or down movement in FIG. 6, can be converted into a rotation of the lens 13 about the center of curvature $M_{13}$, or of the lens 14 about the center of curvature $M_{14}$ respectively.

I claim:

1. An apparatus for reading a record carrier on which information is stored in an optically readable structure of areas and intermediate regions which are arranged along tracks, of the type wherein the apparatus includes a radiation source which supplies a read beam, an objective system for focussing the read beam to a read spot on the optical structure of the record carrier, a beam deflecting element for moving the read spot with respect to the record carrier, and a radiation-sensitive detection system for converting the read beam which is modulated by the areas and intermediate regions into an electrical signal, the improvement wherein the beam-deflecting element comprises an assembly of a plano-concave lens and a plano-convex lens, the concave surface of the first lens facing the convex surface of the second lens, said plano-convex and plano-concave lens surfaces having substantially the same radius of curvature and are disposed at a distance which is substantially smaller than said radius of curvature, a first axis associated with said plano-convex lens and being defined as a line perpendicular to the optical axis of the objective system and passing therethrough, a second axis associated with said plano-convex lens and being defined as a line passing through the first axis and through the optical axis of the objective system and perpendicular to both the first axis and the optical axis of the objective system, a third axis associated with said plano-concave lens and being defined as a line parallel to the first axis and passing through the optical axis of the objective system, a fourth axis associated with said plano-concave lens and passing through the optical axis of the objective system parallel to said second axis, two of said first through fourth axes that are perpendicularly oriented being pivotal axes, the lens associated with the particular pivotal axis being pivotally mounted to angularly move about said associated axis, one of the pivotal axes being parallel to the section of track on which the objective system is focussed, said lens assembly being in the vicinity of a pupil of said objective lens.

2. An apparatus as claimed in claim 1, wherein the radiation path from the radiation source to the beam deflecting element includes a correction element in the form of a single positive lens.

3. An apparatus as claimed in claim 1, further comprising a pair of rods, the lenses being rigidly secured by said rods, which are rotatable about said pivotal axes in bearings, the line between the bearings associated with a lens passing through the center of curvature of the curved surface of the relevant lens, magnetic poles, filamentary windings on each lens facing said magnet poles, the filamentary winding of one of said lenses of said assembly comprising means for receiving a control signal for centering the read spot relative to a track to be read, and the filamentary windings of the other lens of said assembly comprising means for receiving a control signal for positioning the read spot in the longitudinal direction of a track to be read.

* * * * *

UNITED STATES PATENT AND TRADEMARK OFFICE
CERTIFICATE OF CORRECTION

PATENT NO. : 3,924,063

DATED : December 2, 1975

INVENTOR(S) : CAREL ARTHUR JAN SIMONS

It is certified that error appears in the above-identified patent and that said Letters Patent are hereby corrected as shown below:

Col. 1, line 17, "regions" should be --areas--;
line 18, "areas" should be --regions--;
line 30, "regions" should be --areas--;
line 21, "areas" should be --regions--;

Col. 2, line 30, "regions" should be --areas--;
line 31, "areas" should be --regions--;

Col. 5, line 31, "centre" should be --center--;

Col. 6, line 48, "Said" should be --The--;

Signed and Sealed this

Thirteenth Day of July 1976

[SEAL]

*Attest:*

RUTH C. MASON
*Attesting Officer*

C. MARSHALL DANN
*Commissioner of Patents and Trademarks*